(12) United States Patent
Miyajima

(10) Patent No.: US 7,133,249 B2
(45) Date of Patent: Nov. 7, 2006

(54) RECORDING DISK DRIVE HAVING RECTIFIER PLATE AND RAMP MEMBER THEREFOR

(75) Inventor: Keiichi Miyajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 196 days.

(21) Appl. No.: 10/710,374

(22) Filed: Jul. 6, 2004

(65) Prior Publication Data
US 2005/0168867 A1    Aug. 4, 2005

(30) Foreign Application Priority Data
Jan. 30, 2004    (JP)    ............................. 2004-024538

(51) Int. Cl.
*G11B 5/54* (2006.01)
*G11B 33/14* (2006.01)
(52) U.S. Cl. .............. 360/97.02; 360/97.03; 360/254.7; 360/254.8
(58) Field of Classification Search ............. 360/254.7, 360/254.8
See application file for complete search history.

(56) References Cited

U.S. PATENT DOCUMENTS

| | | | | |
|---|---|---|---|---|
| 3,984,873 | A | 10/1976 | Pejcha | ......................... 360/105 |
| 5,204,793 | A * | 4/1993 | Plonczak | .................. 360/97.01 |
| 5,274,519 | A | 12/1993 | Saito et al. | ................. 360/105 |
| 5,526,206 | A | 6/1996 | Shimizu | ..................... 360/105 |
| 6,028,745 | A | 2/2000 | Nguyen et al. | ............. 360/105 |
| 6,084,753 | A * | 7/2000 | Gillis et al. | .................. 360/128 |
| 6,496,327 | B1 * | 12/2002 | Xia et al. | ................. 360/97.03 |
| 6,570,741 | B1 | 5/2003 | Yamanouchi | ............ 360/254.4 |
| 6,882,501 | B1 * | 4/2005 | Machcha et al. | ......... 360/97.03 |
| 6,903,899 | B1 * | 6/2005 | Sakata et al. | ............ 360/97.03 |
| 2001/0033459 | A1 | 10/2001 | Boutaghou | ................ 360/254.3 |
| 2002/0015255 | A1 * | 2/2002 | Tadepalli et al. | ......... 360/97.02 |
| 2002/0036862 | A1 * | 3/2002 | Tsang et al. | ............. 360/79.02 |
| 2002/0063991 | A1 * | 5/2002 | Machcha et al. | ......... 360/97.03 |
| 2004/0120071 | A1 * | 6/2004 | Akama et al. | ............ 360/97.02 |
| 2004/0240112 | A1 * | 12/2004 | Lee et al. | .................... 360/137 |

FOREIGN PATENT DOCUMENTS

JP    2001-332048    11/2001

* cited by examiner

*Primary Examiner*—Jefferson Evans
(74) *Attorney, Agent, or Firm*—Armstrong, Kratz, Quintos,, Hanson & Brooks, LLP

(57) ABSTRACT

A recording disk drive comprises a head actuator coupled to a support shaft for relative rotation so as to support a head slider at a tip end of the head actuator. A rectifier plate is located at a location outside an arc defined along a movement path of the tip end of the head actuator. The rectifier plate is thus located downstream of the head slider. The distance between the rectifier plate and the head slider is maintained constant regardless of the position of the head slider. Turbulence of the airflow can reliably be suppressed downstream of the head slider during the rotation of the recording disk.

7 Claims, 4 Drawing Sheets

RECORDING DISK DRIVE HAVING RECTIFIER PLATE AND RAMP MEMBER THEREFOR

BACKGROUND OF INVENTION

1. Field of the Invention

The present invention relates to a recording medium drive such as a hard disk drive (HDD). In particular, the invention relates to a recording medium drive comprising: an enclosure; a recording disk incorporated in the enclosure; a head slider opposed to the surface of the recording disk; and a head actuator coupled to a support shaft for relative rotation so as to support the head slider at the tip end of the head actuator.

2. Description of the Prior Art

As shown in FIG. 6 of Japanese Patent Application Publication No. 2001-332048, a hard disk drive (HDD) sometimes comprises a ramp member. The ramp member crosses a data zone on the magnetic recording disk in the radial direction of a magnetic recording disk. The ramp member is designed to guide a load bar to an area inside the data zone on the magnetic recording disk. When the magnetic recording disk is driven, the ramp member retreats from the path of movement of the load bar. When a head slider is positioned at a target recording track, the load bar can be prevented from colliding or contacting against the ramp member. When the ramp member retreats from the path of movement of the load bar, the ramp member gets remoter from the path of movement of the load bar at a location closer to the innermost recording track on the magnetic recording disk.

Airflow is generated along the surface of the magnetic recording disk during the rotation of the magnetic recording disk. This airflow acts on the head slider. The airflow causes the head slider to fly above the surface of the magnetic recording disk. In this situation, the turbulence is induced in the airflow downstream of the head slider. The turbulence of the airflow induces a sway of the head slider over the magnetic recording disk. The head slider may be hindered from being accurately positioned. No attention is paid to the turbulence of the airflow in the aforementioned ramp member.

SUMMARY OF THE INVENTION

It is accordingly an object of the present invention to provide a recording disk drive capable of greatly contributing to suppression of turbulence of airflow. It is accordingly another object of the present invention to provide a ramp member greatly useful to realize the aforementioned recording disk drive.

According to a first aspect of the present invention, there is provided a recording disk drive comprising: an enclosure; a recording disk incorporated in the enclosure; a head slider opposed to a surface of the recording disk; a head actuator coupled to a support shaft for relative rotation so as to support the head slider at a tip end of the head actuator; and a rectifier plate located at a location outside an arc defined along a movement path of the tip end of the head actuator, the rectifier plate having an edge extending on an arc equidistant from the support shaft.

The rectifier plate is located at a location outside an arc defined along the movement path of the tip end of the head actuator in the recording disk drive. The rectifier plate is located downstream of the head slider. Moreover, the edge of the rectifier plate extends on the arc equidistant from the support shaft. Therefore, the distance between the rectifier plate and the head slider is maintained constant regardless of the position of the head slider. Turbulence of airflow can reliably be suppressed downstream of the head slider during the rotation of the recording disk.

The recording disk drive may further comprise: an attachment base fixed on the enclosure at a location outside the recording disk and designed to support the rectifier plate; and an airflow guiding surface defined on the attachment base so as to face the recording disk at a location outside a shroud surface, said airflow guiding surface designed to guide airflow generated based on rotation of the recording disk.

The shroud surface is defined around the recording disk at a location outside the outer periphery of the recording disk. The shroud surface is equidistant from the outer periphery of the recording disk. The airflow guiding surface is opposed to the recording disk at a location outside the shroud surface. A space is thus defined between the recording disk and the airflow guiding surface. The rectifier plate is allowed to block the airflow during the rotation of the recording disk. The airflow is caused to flow along the edge of the rectifier plate toward the outermost periphery of the recording disk. The airflow thus flows into the space. Therefore, the airflow is prevented from staying above the recording disk. The sway of the head slider can be suppressed. The head slider can thus be positioned right at a target recording track with a higher accuracy. The recording disk drive is capable of greatly contributing to a still higher recording density.

A dust catcher may be located at a space defined between the airflow guiding surface and the recording disk. The dust catcher is exposed to the airflow flowing into the space. Dust tends to gather within the space in the recording disk drive. Accordingly, the dust catcher can reliably catch a large amount of dust in the recording disk drive. Since the dust catcher hardly blocks the airflow, a smooth airflow can always be kept in the space irrespective of the existence of the dust catcher.

When two or more of the recording disk are incorporated in the enclosure, the rectifier plate may be located in a space defined between adjacent ones of the recording disk. The rectifier plate serves to suppress the turbulence of the airflow in the space defined between adjacent ones of the recording disk. According to an examination of the inventor of the present invention, it has been proved that the rectifier plate and the airflow guiding surface serve to suppress the sway of the head slider relative to the recording disk. In particular, it has been proved that the accuracy of the positioning of the head slider can be largely improved between the recording disks.

The recording disk drive may further comprise: a ramp extending forward from the attachment base at a position adjacent the rectifier plate, said ramp terminated within a space above a non-data zone on the recording disk; a slope defined at a front end of the ramp so as to receive the tip end of the head actuator; and a guiding passage extending backward from a rear end of the slope and terminated on the ramp, said guiding passage designed to receive the tip end of the head actuator.

A specific ramp member may be provided to realize the aforementioned recording disk drive. The ramp member may comprise an attachment base; a ramp extending forward from the attachment base; a rectifier plate designed to extend forward from a front end of the ramp, the rectifier plate having an edge described on an arc of a predetermined curvature; a slope defined at the front end of the ramp so as to receive a load bar on a head actuator; and a guiding passage designed to extend backward from the rear end of the slope and terminated on the ramp, said guiding passage designed to receive the load bar on the head actuator. The ramp member is utilized to locate the rectifier plate in the recording disk drive. The rectifier plate and the ramp member can be handled as one component. Therefore, assembling of the recording disk drive can be prevented from getting complicated irrespective of the addition of the rectifier plate. The attachment base, the ramp and the rectifier plate may be integrally made or formed from a resin material, for example, so as to realize the aforementioned ramp member. Molding process may be employed to realize such an integrality.

When the ramp member comprises two or more of the rectifier plate, a dust catcher may be incorporated between adjacent ones of the rectifier plate. The ramp member is utilized to locate the dust catcher in the recording disk drive. The dust catcher and the ramp member can be handled as one component. Therefore, assembling of the recording disk drive can be prevented from getting complicated irrespective of the addition of the dust catcher.

According to a second aspect of the present invention, there is provided a recording disk drive comprising: a recording disk; a head slider opposed to the surface of the recording disk; a head actuator supporting the head slider at the tip end; a ramp member designed to receive the tip end of the head actuator so as to position the head slider at a position spaced from the recording disk; and a dust catcher incorporated in the ramp member.

Since the dust catcher is incorporated in the ramp member, the dust catcher is located outside the recording disk. The dust catcher is exposed to the airflow during the rotation of the recording disk. The dust catcher can reliably catch a large amount of dust in the recording disk drive.

A specific ramp member may be provided to realize the aforementioned recording disk drive. The ramp member may comprise: an attachment base; a ramp designed to extend from the attachment base so as to receive a load bar on a head actuator; and a dust catcher fixed to the attachment base. The ramp member is utilized to locate the dust catcher. The dust catcher and the ramp member can be handled as one component. Therefore, assembling of the recording disk drive can be prevented from getting complicated irrespective of the addition of the dust catcher.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
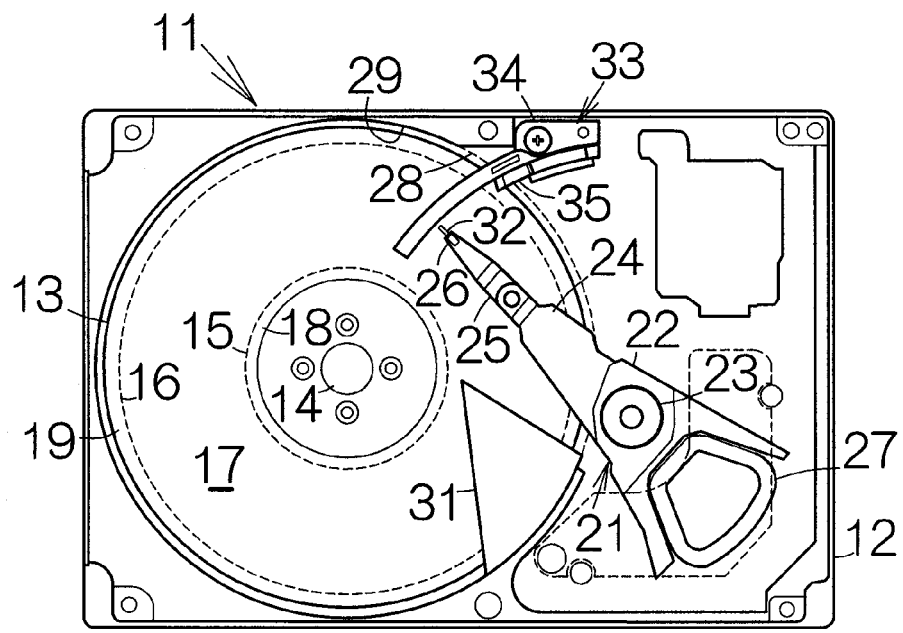
FIG. 1 is a plan view schematically illustrating the structure of a hard disk drive (HDD) as an example of a recording disk drive according to an embodiment of the present invention.

FIG. 1 schematically illustrates the inner structure of a hard disk drive (HDD) 11 as an example of a recording disk drive or storage device according to an embodiment of the present invention. The HDD 11 includes a boxshaped main enclosure 12 defining an inner space of a flat parallelepiped, for example. At least one magnetic recording disk 13 is mounted on the driving shaft of a spindle motor 14 within the main enclosure 12. Here, two magnetic recording disks are mounted, for example. The spindle motor 14 is allowed to drive the magnetic recording disk 13 for rotation at a higher revolution speed such as 5,400 rpm, 7,200 rpm, 10,000 rpm, or the like for example. A cover, not shown, is coupled to the main enclosure 12 so as to define the closed inner space between the main enclosure 12 and the cover itself.

A data zone 17 is defined over the front and back surfaces of the individual magnetic recording disk 13 between an innermost recording track 15 and an outermost recording track 16. Concentric recording circles or tracks are defined within the data zone 17. No magnetic information is recorded on marginal zone or non-data zone 18 inside the innermost recording track 15. Likewise, no magnetic information is recorded on marginal zone or non-data zone 19 outside the outermost recording track 16.

A head actuator 21 is also accommodated in the inner space of the main enclosure 12. The head actuator 21 comprises an actuator block 22. The actuator block 22 is coupled to a vertical support shaft 23 for relative rotation. Rigid actuator arms 24 are defined in the actuator block 22 so as to extend in the horizontal direction from the vertical support shaft 23. The actuator block 22 may be made of aluminum. Molding process may be employed to form the actuator block 22.

Head suspensions 25 are fixed to the corresponding tip ends of the actuator arms 24 so as to further extend in the forward direction from the actuator arms 24. A gimbal spring, not shown, is connected to the tip end of the individual head suspension 25. A flying head slider 26 is fixed on the surface of the gimbal spring. The gimbal spring allows the flying head slider 26 to change its attitude relative to the head suspension 25.

An electromagnetic transducer, not shown, is mounted on the flying head slider 26. The electromagnetic transducer may include a read element and a write element. The read element may include a giant magnetoresistive (GMR) element or a tunnel-junction magnetoresistive (TMR) element designed to discriminate magnetic bit data on the magnetic recording disk 13 by utilizing variation in the electric resistance of a spin valve film or a tunnel-junction film, for example. The write element may include a thin film magnetic head designed to write magnetic bit data into the magnetic recording disk 13 by utilizing a magnetic field induced at a thin film coil pattern.

The head suspension 25 serves to urge the flying head slider 26 toward the surface of the magnetic recording disk 13. When the magnetic recording disk 13 rotates, the flying head slider 26 is allowed to receive airflow generated along the rotating magnetic recording disk 13. The airflow serves to generate a positive pressure or lift on the flying head slider 26. The flying head slider 26 is thus allowed to keep flying above the surface of the magnetic recording disk 13 during the rotation of the magnetic recording disk 13 at a higher stability established by the balance between the urging force of the head suspension 19 and the lift.

When the head actuator 21 is driven to swing about the support shaft 23 during the flight of the flying head slider 26, the flying head slider 26 is allowed to move along the radial direction of the magnetic recording disk 13. This radial movement allows the electromagnetic transducer on the flying head slider 26 to cross the data zone 17 between the innermost recording track 15 and the outermost recording track 16. The flying head slider 26 can thus be positioned right above a target recording track on the magnetic recording disk 13. A power source 27 such as a voice coil motor (VCM) may be employed to realize the rotation of the head actuator 21, for example. The rotation of the head actuator 21 induces the swinging movement of the actuator arms 24 and the head suspensions 25.

A shroud surface 28 is defined endlessly around the magnetic recording disks 13 at a location outside the outer peripheries of the magnetic recording disks 13. The shroud surface 28 is equidistant from the outer peripheries of the magnetic recording disks 13. In other words, the shroud surface 28 is concentric to the magnetic recording disks 13. The shroud surface 28 is opposed to the peripheral end surfaces of the magnetic recording disks 13. A shroud 29 is formed on the main enclosure 12 along the shroud surface 28. The shroud 29 stands from the bottom plate of the main enclosure 12. The shroud 29 is designed to break at the range of the swinging movement of the head actuator 21. The shroud 29 may be molded for integral formation with the main enclosure 12, for example. Airflow is generated within the HDD 11 during the rotation of the magnetic recording disks 13. The shroud 29 serves to suppress turbulence of the airflow.

First rectifier plates 31 are opposed to the surfaces of the magnetic recording disks 13. The first rectifier plates 31 are designed to extend in the horizontal direction toward the center of the magnetic recording disks 13. The first rectifier plates 31 are positioned upstream of the head actuator 21. Here, "upstream" and "downstream" are defined based on the direction of the rotation of the magnetic recording disks 13. The single first rectifier plate 31 is located between the adjacent magnetic recording disks 13. Airflow is generated along the surfaces of the magnetic recording disk during the rotation of the magnetic recording disk 13. The first rectifier plates 31 serve to suppress turbulence of the airflow. The first rectifier plates 31 may be made of a resin material, for example.

A load bar 32 is attached to the front or tip end of the head suspension 25 so as to further extend in the forward direction from the head suspension 25. The load bar 32 is allowed to move in the radial direction of the magnetic recording disk 13 based on the swinging movement of the head actuator 21. A ramp member 33 is located outside the magnetic recording disk 13 on the path of movement of the load bar 32. The combination of the load bar 32 and the ramp member 33 establishes a so-called load/unload mechanism as described later in detail. The ramp member 33 may be made of a hard plastic material, for example.

Figure 2:
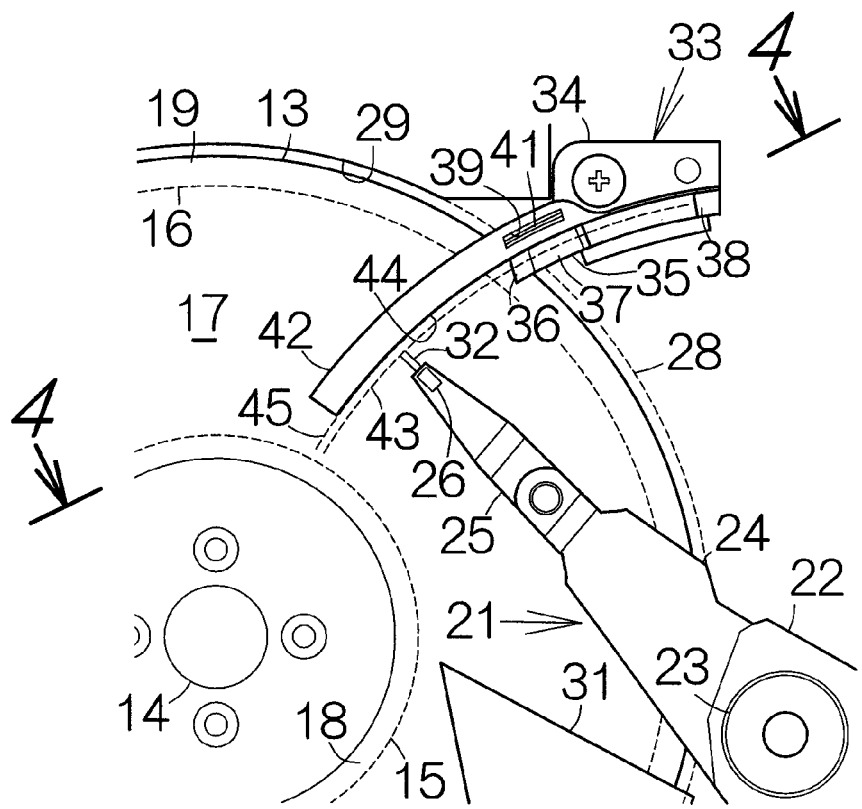
FIG. 2 is an enlarged partial perspective view of the HDD for schematically illustrating a relative relationship between a second rectifier plate and a load bar.

As shown in FIG. 2, the ramp member 33 includes an attachment base 34 fixed on the main enclosure 12. The attachment base 34 may be screwed on the bottom plate of the main enclosure 12. The ramp member 33 includes ramps 35 extending from the attachment base 34 in the horizontal direction toward the rotation axis of the magnetic recording disk 13. The ramps 35 are opposed to the non-data zones 19 outside the outermost recording tracks 16 on the magnetic recording disks 13. The ramps 35 are terminated within spaces above the non-data zones 19 on the magnetic recording disks 13 outside the outermost recording tracks 16. Specifically, the front or tip ends of the ramps 35 are positioned in spaces defined above the non-data zones 19.

A slope 36 is defined on the front end of the individual ramp 35 so as to extend outward in the radial or centrifugal direction of the magnetic recording disk 13. The slope 36 is designed to get remote from the surface of the magnetic recording disk 13 at the radially outer location of the magnetic recording disk 13. A guiding passage 37 is connected to the outer end of the slope 36 so as to extend outward in the radial or centrifugal direction of the magnetic recording disk 13. The guiding passage 37 is terminated on the ramp 35. A depression 38 is connected to the outer end of the guiding passage 37.

A receiving hole or slit 39 is defined in the attachment base 34. The slit 39 may reach the bottom surface of the attachment base 34, for example. The slit 39 is designed to receive a dust catcher or filter 41. The filter 41 is thus located outside the magnetic recording disks 13. The filter 41 is exposed to airflow generated during the rotation of the magnetic recording disk 13. In this case, an electret filter can be utilized for the filter 41. The electret filter may be made of a polypropylene resin material, for example. The electret filter serves to effectively catch dust due to the static electricity without losing the pressure of the airflow.

The ramp member 33 includes second rectifier plates 42 extending from the attachment base 34 toward the rotation axis of the magnetic recording disk 13 at locations adjacent the ramps 35. The second rectifier plates 42 are integral to the ramp member 33. The second rectifier plates 42 extend forward from the front ends of the ramps 35. In other words, the second rectifier plates 42 are located closer to the rotation axis of the magnetic recording disk 13 than the front ends of the ramps 35. The second rectifier plates are stationarily located outside an arc 43 described along the movement path of the tip end of the load bar 32 or the head actuator 21. The second rectifier plates 42 are positioned downstream of the flying head slider 26. A side edge 44 of the individual second rectifier plate 42 is defined on an arc 45 having a predetermined curvature. The arc 45 is equidistant from the vertical support shaft 23 of the head actuator 21. Specifically, the arc 45 is equidistant from the aforementioned arc 43. The second rectifier plate 42 may have a width larger than that of the ramps 35 or the slope 36. Such a width should be measured in the circumferential direction of the magnetic recording disk 13.

Figure 3:
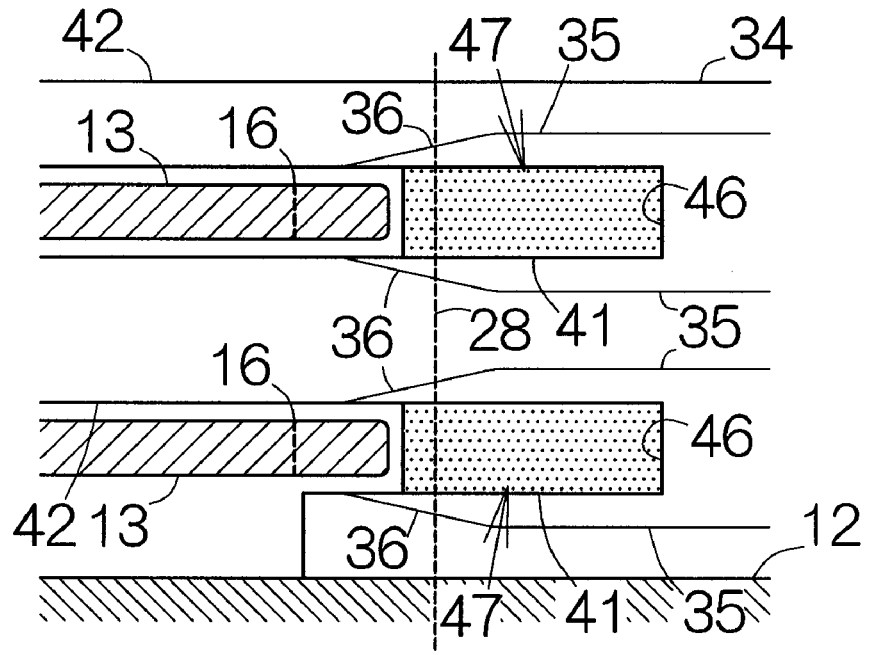
FIG. 3 is an enlarged sectional view of a ramp member for schematically illustrating a relative relationship between an airflow guiding surface and a magnetic recording disk.
Figure 4:
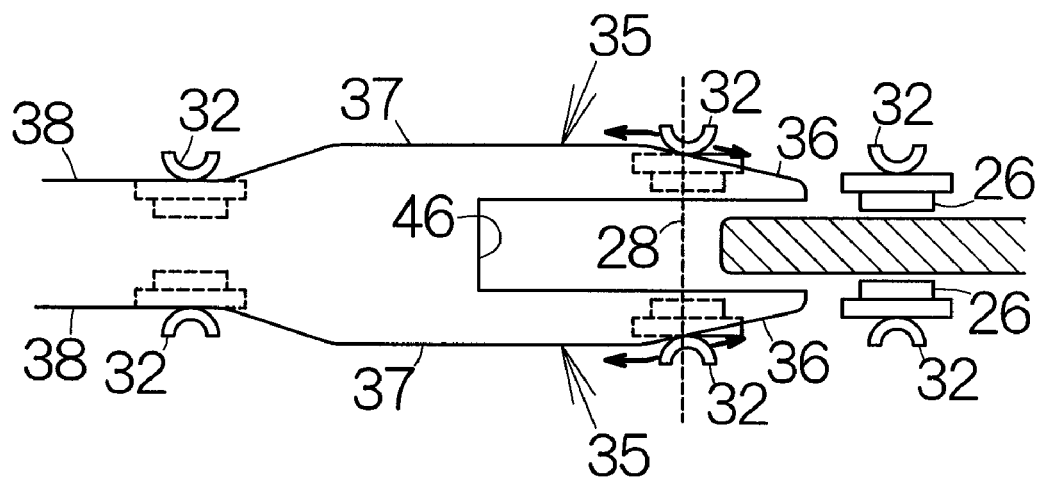
FIG. 4 is an enlarged partial sectional view of the HDD, taken along the line 4—4 in FIG. 2, for schematically illustrating the structure and function of the ramp member.

As shown in FIG. 3, the single second rectifier plate 42 is located between the adjacent magnetic recording disks 13. The second rectifier plates 42 are designed to face the individual magnetic recording disk 13 at equal distances. On the other hand, an airflow guiding surface 46 is defined on the attachment base 34. The airflow guiding surface 46 is opposed to the peripheral end surface of the corresponding magnetic recording disk 13 at a position outside the shroud surface 28. A space 47 is defined between the airflow guiding surface 46 and the magnetic recording disk 13. The aforementioned filter 41 is located in the space 47.

Now, assume that the magnetic recording disks 13 stop rotating. When read/write operation has been completed during the rotation of the magnetic recording disks 13, the power source 27 drives the actuator arm 24 in a normal direction toward the inoperative position. As shown in FIG.

4, when the flying head sliders 26 get opposed to the non-data zones 19 or landing zone outside the outermost recording tracks 16, the load bars 32 are allowed to contact the slopes 36 of the ramps 35. A further swinging movement of the actuator arm 24 allows the load bars 32 to climb up the slopes 36. As the load bars 32 climb the slopes 36, the flying head sliders 26 get remote from the surfaces of the magnetic recording disks 13. The load bars 32 are in this manner received on the ramp member 33. When the actuator arm 24 has reached the inoperative position, the load bars 32 are received in the depressions 38. The magnetic recording disks 13 then stop rotating. Since the load bars 32 are reliably held on the ramp member 33, the flying head sliders 26 are prevented from colliding against or contacting the magnetic recording disks 13 even without any airflow acting on the flying head sliders 26. The flying head sliders 26 are thus effectively prevented from any attachment to a lubricant agent covering over the surfaces of the magnetic recording disks 13.

When the HDD 11 receives instructions to read or write magnetic information, the magnetic recording disks 13 start to rotate. The power source 27 drives the actuator arm 24 in the reverse direction opposite to the aforementioned normal direction after the rotation of the magnetic recording disk 13 has entered the steady condition. The load bars 32 are allowed to move out of the depressions 38 toward the slopes 36. A further swinging movement of the actuator arm 24 causes the load bars 32 to move down the slopes 36. During the downward movement of the load bar 32, the flying head slider 26 gets opposed to the surface of the magnetic recording disk 13. Airflow generated along the surface of the magnetic recording disk 13 induces a lift on the flying head slider 26. A further swinging movement of the actuator arm 24 allows the load bar 32 to take off from the slope 36 or ramp member 33. Since the magnetic recording disk 13 rotates in the steady condition, the flying head sliders 26 are thus allowed to fly above the surfaces of the magnetic recording disks 13 without a support from the ramp member 33. The actuator arm 24 is thereafter positioned at the target recording track.

The second rectifier plates 42 are fixedly located downstream of the flying head sliders 26 in the HDD 11. Moreover, the side edge 44 of the individual second rectifier plate 42 is defined along the arc 45 equidistant from the vertical support shaft 23. Therefore, the distance between the second rectifier plates 42 and the flying head sliders 26 is maintained constant regardless of the position of the flying head sliders 26. Turbulence of the airflow can reliably be suppressed downstream of the flying head sliders 26 during the rotation of the magnetic recording disks 13.

Moreover, the second rectifier plates 42 are allowed to block the airflow. The airflow is caused to flow along the side edges 44 of the second rectifier plates 42 toward the outermost peripheries of the magnetic recording disks 13. The airflow thus flows into the space 47. Therefore, the airflow is prevented from staying above the magnetic recording disk 13. The sway of the flying head slider 26 can be suppressed. The flying head slider 26 can thus be positioned right at the target recording track with a higher accuracy. The HDD 11 is capable of greatly contributing to a still higher recording density. Furthermore, since the filter 41 hardly blocks the airflow, a smooth airflow can always be kept in the space 47 irrespective of the existence of the filter 41.

Moreover, the filter 41 is exposed to the airflow flowing into the space 47. Dust tends to gather within the space 47 in the HDD 11. Accordingly, the filter 41 can reliably catch a larger amount of dust in the HDD 11. If the electret filter is utilized as the filter 41, the static electricity serves to promote the catch of the dust in the filter 41. Additionally, the ramp member 33 is utilized to locate the filter 41. The filter 41 and the ramp member 33 can be handled as one component. Therefore, assembling of the HDD 11 can be prevented from getting complicated irrespective of the addition of the filter 41.

Likewise, the ramp member 33 is utilized to locate the second rectifier plates 42 in the HDD 11. The second rectifier plates 42 and the ramp member 33 can be handled as one component. Therefore, assembling of the HDD 11 can be prevented from getting complicated regardless of the addition of the second rectifier plates 42. The attachment base 34, the ramp 35 and the second rectifier plates 42 may be integrally made or formed of a resin material, for example, so as to realize the aforementioned ramp member 33. Molding process may be employed to realize such an integrality.

The inventor has examined the effect of the aforementioned second rectifier plates 42 and the airflow guiding surface 46. The inventor prepared the HDD 11 according to an example of the present invention. Two magnetic recording disks 13 were incorporated in the HDD 11. The flying head sliders 26 were opposed to the front and back surfaces of the individual magnetic recording disks 13. No filter 41 was incorporated in the HDD 11. The inventor also prepared a HDD according to a comparative example. A conventional ramp member was incorporated in the HDD. No second rectifier plates and no filter were incorporated in the comparative example.

In this examination, the inventor has measured a repeatable run-out (RRO) and a non-repeatable run-out (NRRO). The repeatable run-out is a positional deviation of the flying head slider in synchronization with the rotation of the spindle motor in the HDD. The non-repeatable run-out is a positional deviation of the flying head slider out of synchronization with the rotation of the spindle motor in the HDD. The flying head sliders were positioned near the outermost tracks 16, near the innermost tracks 15, and the intermediate areas between the outermost and innermost tracks 16, 15 in the radial direction. Four flying head sliders read information from the magnetic recording disks during the rotation of the magnetic recording disks. The repeatable run-out and non-repeatable run-out were analyzed based on the information read from the magnetic recording disk.

It has been proved that the HDD 11 according to the example of the present invention exhibits a reduced non-repeatable run-out as compared with the conventional HDD. Specifically, it has been proved that the second rectifier plates 42 serve to suppress or avoid turbulence of the airflow. It has also been proved that the second rectifier plates 42 and the airflow guiding surfaces 46 serve to suppress the sway of the flying head slider 26 relative to the magnetic recording disks 13. In particular, it has been observed that the non-repeatable run-out could largely be suppressed between the magnetic recording disks 13, although the relatively larger non-repeatable run-out were measured in the conventional HDD. It has been proved that the second rectifier plates 42 and the airflow guiding surfaces 46 serve to largely improve the accuracy of the positioning of the flying head sliders 26.

Figure 5:
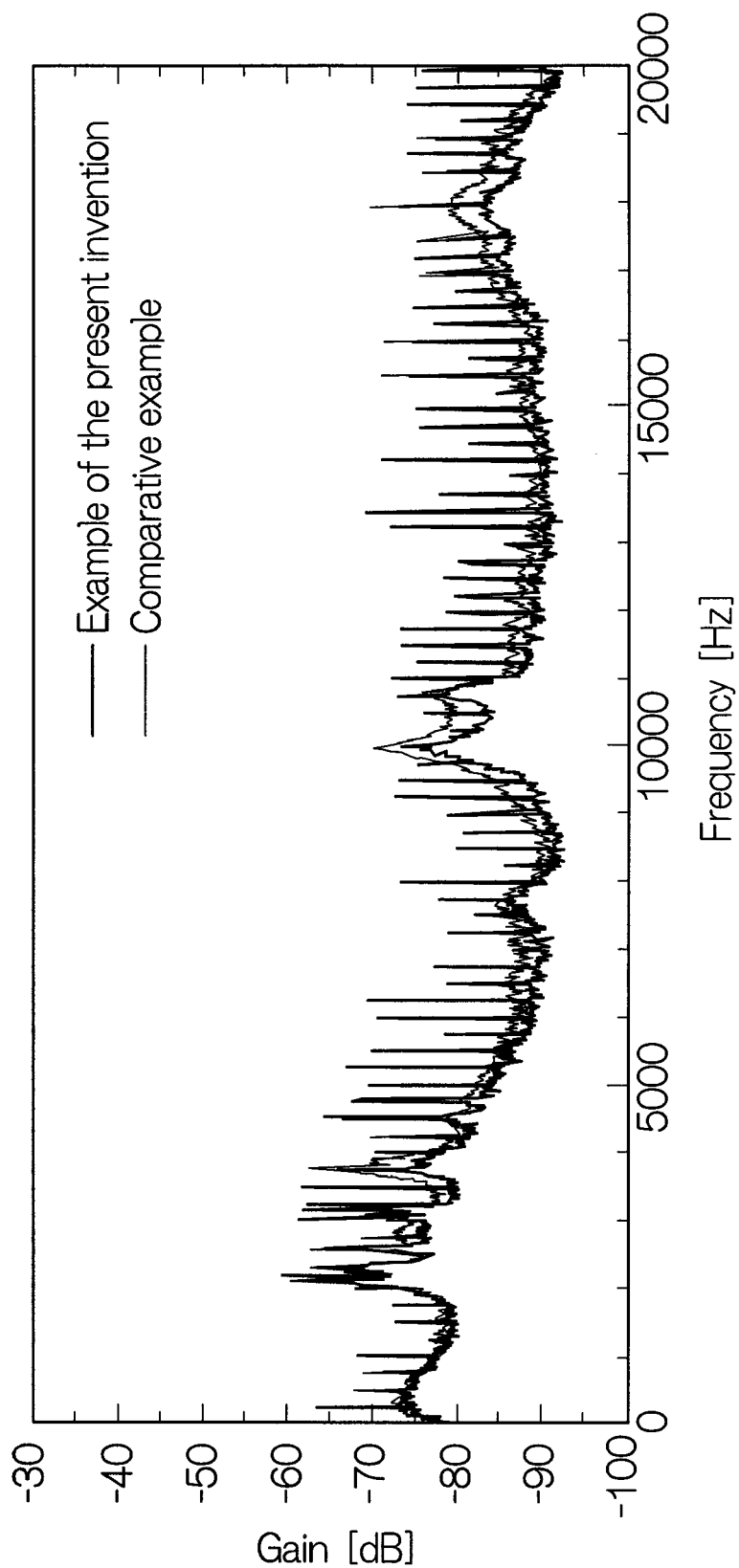
FIG. 5 is a graph showing the frequency characteristics of an oscillation of head sliders positioned at outermost areas of magnetic recording disks.

FIG. 5 shows frequency characteristics of the vibration of the flying head slider 26. Here, the frequency of the vibration was measured based on the flying head slider 26 located between the adjacent magnetic recording disks 13. The flying head slider 26 was positioned near the outermost track 16 on the magnetic recording disk 13. It has been proved that the gain of the frequency can be suppressed in the example of the present invention as compared with the comparative example. It has been confirmed that the second rectifier plates 42 and the airflow guiding surfaces 46 serve to suppress the sway of the flying head sliders 26 and the magnetic recording disks 13. It has been proved that the second rectifier plates 42 and the airflow guiding surfaces 46 serve to largely improve the accuracy of the positioning of the flying head sliders 26.

Figure 6:
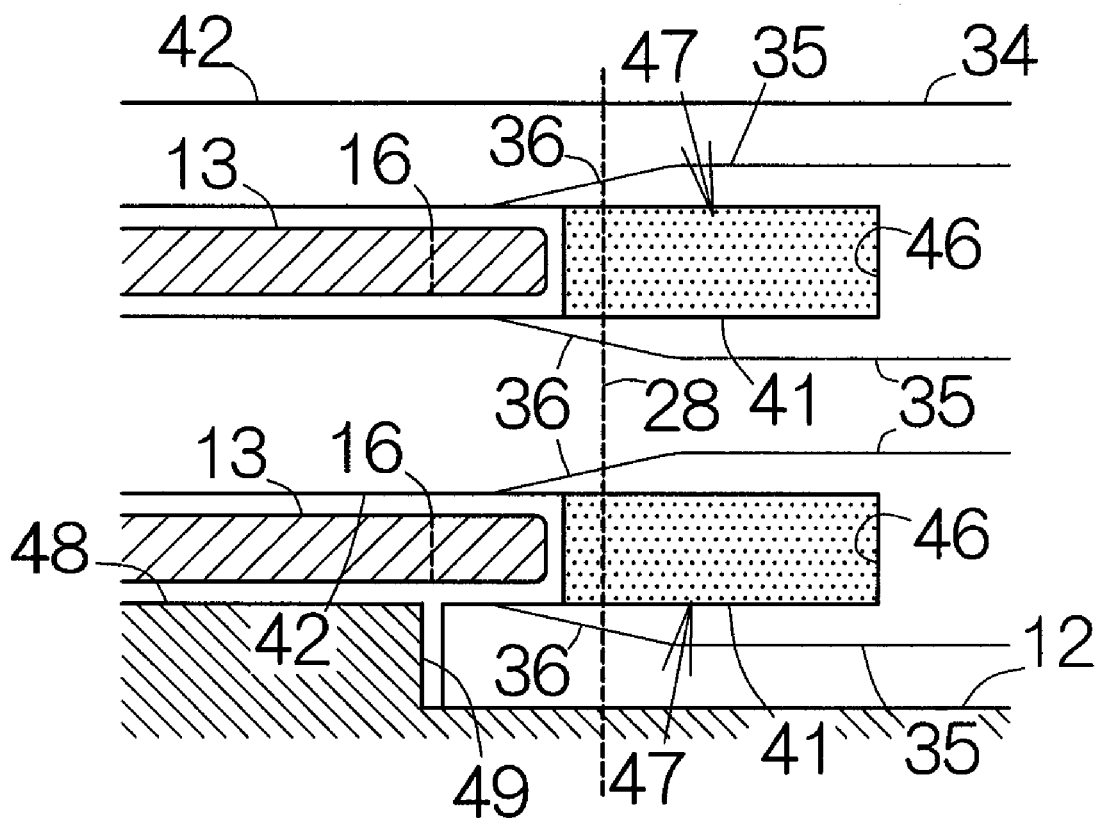
FIG. 6 is an enlarged partial sectional view of the ramp member, corresponding to FIG. 3, schematically illustrating a relative relationship between an airflow guiding surface and a magnetic recording disk according to a modified embodiment of the present invention.

As shown in FIG. 6, for example, a rectifier surface 48 may be opposed to the back surface of the lowest magnetic recording disk 13 closest to the bottom plate of the main enclosure 12. The rectifier surface 48 is designed to extend toward the rotation axis of the magnetic recording disk 13 in the same manner as the aforementioned rectifier plate 42. The rectifier surface 48 is located in front of the front end of the ramp 35. Specifically, the rectifier surface 48 is located closer to the rotation axis of the magnetic recording disk 13 than the front ends of the ramps 35. A side edge of the rectifier surface 48 is defined on the aforementioned arc 45. The rectifier surface 48 may have a width larger than that of the ramps 35 or the slopes 36. Such a width should be measured in the circumferential direction of the magnetic recording disk 13. The rectifier surface 48 may be defined on a top surface of a protrusion block 49 standing from the bottom plate of the main enclosure 12. The protrusion block 49 may be integral to the main enclosure 12, for example. The rectifier surface 48 reliably serves to suppress turbulence of the airflow downstream of the flying head sliders 26.

The invention claimed is:

1. A recording disk drive comprising:
   an enclosure;
   a recording disk incorporated in the enclosure;
   a head slider opposed to a surface of the recording disk;
   a head actuator coupled to a support shaft for relative rotation so as to support the head slider at a tip end of the head actuator;
   an attachment base fixed on the enclosure at a location outside the recording disk;
   a rectifier plate supported on the attachment base and arranged at a location outside an arc defined along a movement path of the tip end of the head actuator, the rectifier plate having an edge extending on an arc equidistant from the support shaft;
   an airflow guiding surface defined on the attachment base so as to face the recording disk at a location outside a shroud surface, said airflow guiding surface designed to guide airflow generated based on rotation of the recording disk; and
   a dust catcher located in a space defined between the airflow guiding surface and the recording disk.

2. The recording disk drive according to claim 1, further comprising:
   a ramp extending forward from the attachment base at a position adjacent the rectifier plate, said ramp terminated within a space above a non-data zone on the recording disk;
   a slope defined at a front end of the ramp so as to receive the tip end of the head actuator; and
   a guiding passage extending backward from a rear end of the slope and terminated on the ramp, said guiding passage designed to receive the tip end of the head actuator.

3. The recording disk drive according to claim 1, wherein two or more of the recording disks are incorporated in the enclosure, the rectifier plate being located in a space defined between adjacent recording disks.

4. The recording disk drive according to claim 3, further comprising:
   an attachment base fixed on the enclosure at a location outside the recording disks so as to support the rectifier plate; and
   an airflow guiding surface defined on the attachment base so as to face the recording disks at a location outside a shroud surface of the recording disks.

5. The recording disk drive according to claim 4, wherein a dust catcher is located at a space defined between the airflow guiding surface and the recording disks.

6. The recording disk drive according to claim 4, further comprising:
   a ramp extending forward from the attachment base at a position adjacent the rectifier plate, said ramp terminated within the space above a non-data zone on the recording disks;
   a slope defined at a front end of the ramp so as to receive the tip end of the head actuator; and
   a guiding passage extending backward from a rear end of the slope and said guiding passage designed to receive the tip end of the head actuator.

7. A ramp member comprising:
   an attachment base;
   a ramp extending forward from the attachment base;
   rectifier plates designed to extend forward from a front end of the ramp, the rectifier plates each having an edge described on an arc of a predetermined curvature;
   a slope defined at the front end of the ramp so as to receive a load bar on a head actuator; and
   a guiding passage designed to extend backward from the rear end of the slope and terminated on the ramp, said guiding passage designed to receive the load bar on the head actuator; and
   a dust catcher incorporated between adjacent ones of the rectifier plates.

* * * * *